United States Patent
Tsai

(10) Patent No.: US 7,516,512 B2
(45) Date of Patent: Apr. 14, 2009

(54) CASTOR HAVING EFFICIENTLY LOCKING FUNCTION

(76) Inventor: Po-Chuan Tsai, 144, Zhung Zhou, Zhungsheng Cun, Rende Hsiang, Tainan Hsien (TW)

( * ) Notice: Subject to any disclaimer, the term of this patent is extended or adjusted under 35 U.S.C. 154(b) by 336 days.

(21) Appl. No.: 11/454,768

(22) Filed: Jun. 16, 2006

(65) Prior Publication Data

US 2007/0289098 A1    Dec. 20, 2007

(51) Int. Cl.
*B60B 33/00* (2006.01)

(52) U.S. Cl. ............................. 16/35 R; 16/18 R; 16/33

(58) Field of Classification Search .................. 16/35 R, 16/18 R, 45, 47, 32, 33
See application file for complete search history.

(56) References Cited

U.S. PATENT DOCUMENTS

| | | | | |
|---|---|---|---|---|
| 1,064,244 A | * | 6/1913 | Neugebauer | 16/33 |
| 1,931,446 A | * | 10/1933 | Muller | 16/33 |
| 3,879,796 A | * | 4/1975 | Whyte | 16/33 |
| 5,431,254 A | * | 7/1995 | Kramer et al. | 188/7 |
| 5,615,451 A | * | 4/1997 | Peterson et al. | 16/34 |
| 5,988,323 A | * | 11/1999 | Chu | 16/35 R |
| 6,843,625 B2 | * | 1/2005 | Hewitt | 280/763.1 |

FOREIGN PATENT DOCUMENTS

| | | | |
|---|---|---|---|
| GB | 2099693 A | * | 12/1982 |
| GB | 2192533 A | * | 1/1988 |
| JP | 63203402 A | * | 8/1988 |

* cited by examiner

*Primary Examiner*—Robert J. Sandy
*Assistant Examiner*—Jeffrey O'Brien
(74) *Attorney, Agent, or Firm*—Alan Kamrath; Kamrath & Associates PA

(57) ABSTRACT

A castor includes a main body, two rollers each rotatably mounted on the main body, a stop member movable in the main body between a first position where the stop member is located at a height higher than that of each of the two rollers and a second position where the stop member is located at a height lower than that of each of the two rollers, a slide slidably mounted in the main body to move the stop member, and a control member pivotally mounted on the main body to move the slide. Thus, when the stop member is movable downward to rest on the ground, the two rollers are suspended in the air, so that the castor is locked exactly without slipping or moving on the ground.

15 Claims, 6 Drawing Sheets

US 7,516,512 B2

CASTOR HAVING EFFICIENTLY LOCKING FUNCTION

BACKGROUND OF THE INVENTION

1. Field of the Invention

The present invention relates to a castor and, more particularly, to a castor for a chair and the like.

2. Description of the Related Art

A conventional castor in accordance with the prior art shown in FIGS. 6 and 7 comprises a main body 1, two rollers 10 each rotatably mounted on the main body 1 and each having an inside formed with a locking slot 12, and a control member 11 pivotally mounted on the main body 1 and provided with a locking rod 13 movable in the locking slot 12 of each of the two rollers 10.

In operation, when the control member 11 is located at the position as shown in FIG. 6, the locking rod 13 of the control member 11 is located at the lower end of the locking slot 12 of each of the two rollers 10, so that the two rollers 10 are rotatable freely, and the castor is movable on the ground. On the contrary, when the control member 11 is located at the position as shown in FIG. 7, the locking rod 13 of the control member 11 is located at the upper end of the locking slot 12 of each of the two rollers 10, so that the two rollers 10 are locked by the locking rod 13 of the control member 11, and the castor cannot be moved on the ground.

However, when the two rollers 10 are locked by the locking rod 13 of the control member 11, the two rollers 10 are still rested on the ground, so that the castor easily slips on the ground by applying a pulling force on the castor, thereby causing inconvenience to the user. In addition, the locking rod 13 of the control member 11 rubs the locking slot 12 of each of the two rollers 10 frequently, so that the locking rod 13 of the control member 11 and the wall of the locking slot 12 of each of the two rollers 10 are easily worn out during a long-term utilization, thereby decreasing the locking effect of the castor.

BRIEF SUMMARY OF THE INVENTION

In accordance with the present invention, there is provided a castor, comprising a main body, two rollers each rotatably mounted on the main body, a stop member movably mounted in the main body and movable between a first position where the stop member is located at a height higher than that of each of the two rollers and a second position where the stop member is located at a height lower than that of each of the two rollers, a slide slidably mounted in the main body and rested on the stop member to move the stop member, and a control member pivotally mounted on the main body and connected to the slide to move the slide.

The primary objective of the present invention is to provide a castor having an efficiently locking function.

Another objective of the present invention is to provide a castor, wherein when the stop member is movable downward to rest on the ground, the two rollers are suspended in the air, so that the castor is locked exactly without slipping or moving on the ground.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
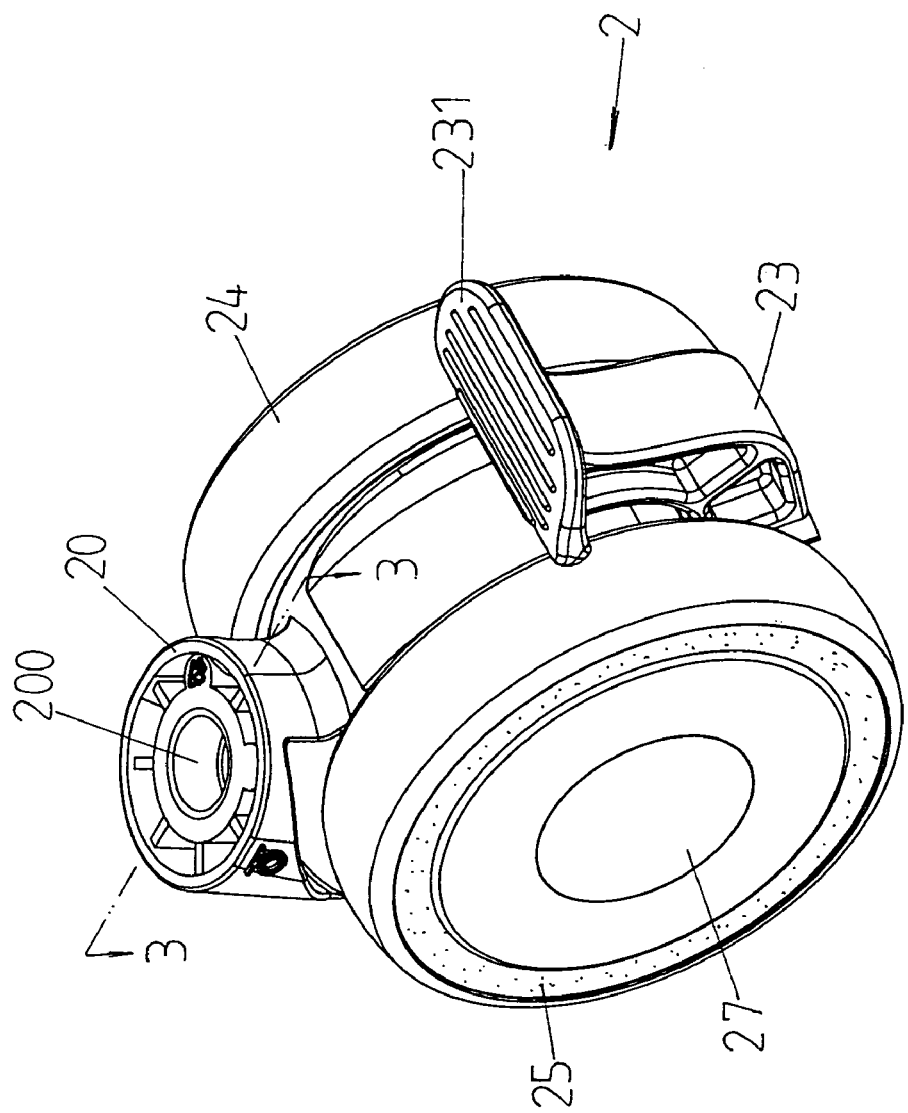
FIG. 1 is a perspective view of a castor in accordance with the preferred embodiment of the present invention.
Figure 2:
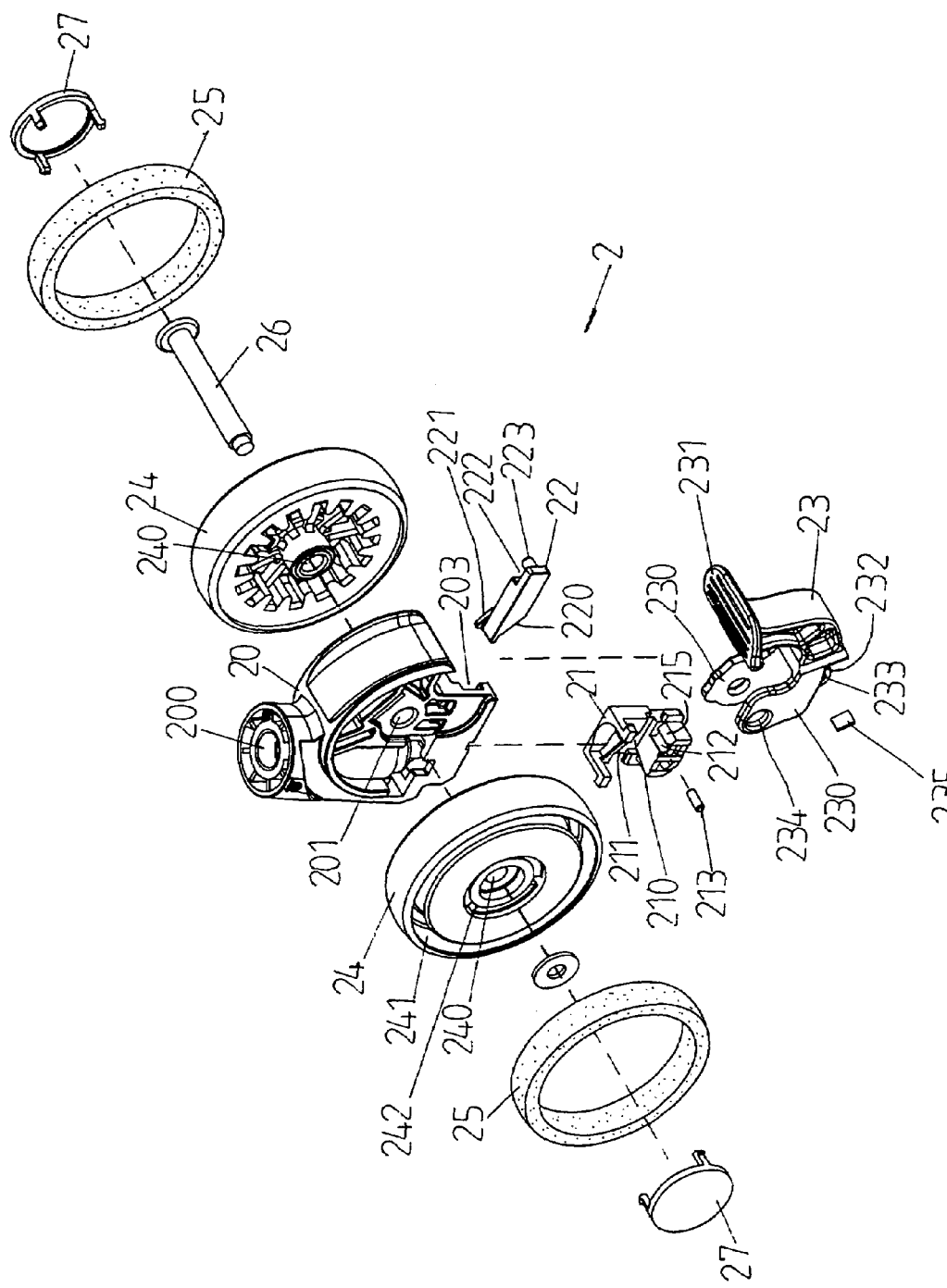
FIG. 2 is an exploded perspective view of the castor as shown in FIG. 1.
Figure 3:
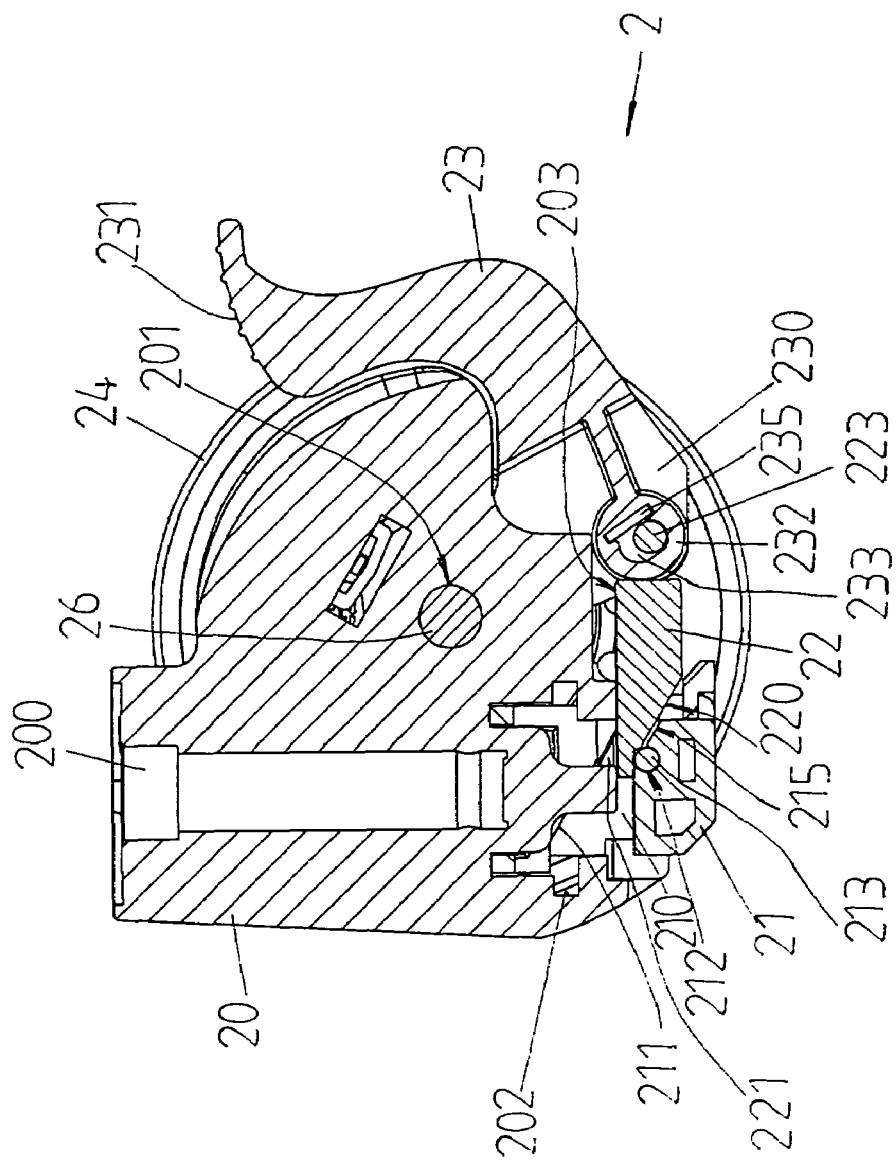
FIG. 3 is a plan cross-sectional view of the castor taken along line 3-3 as shown in FIG. 1.
Figure 4:
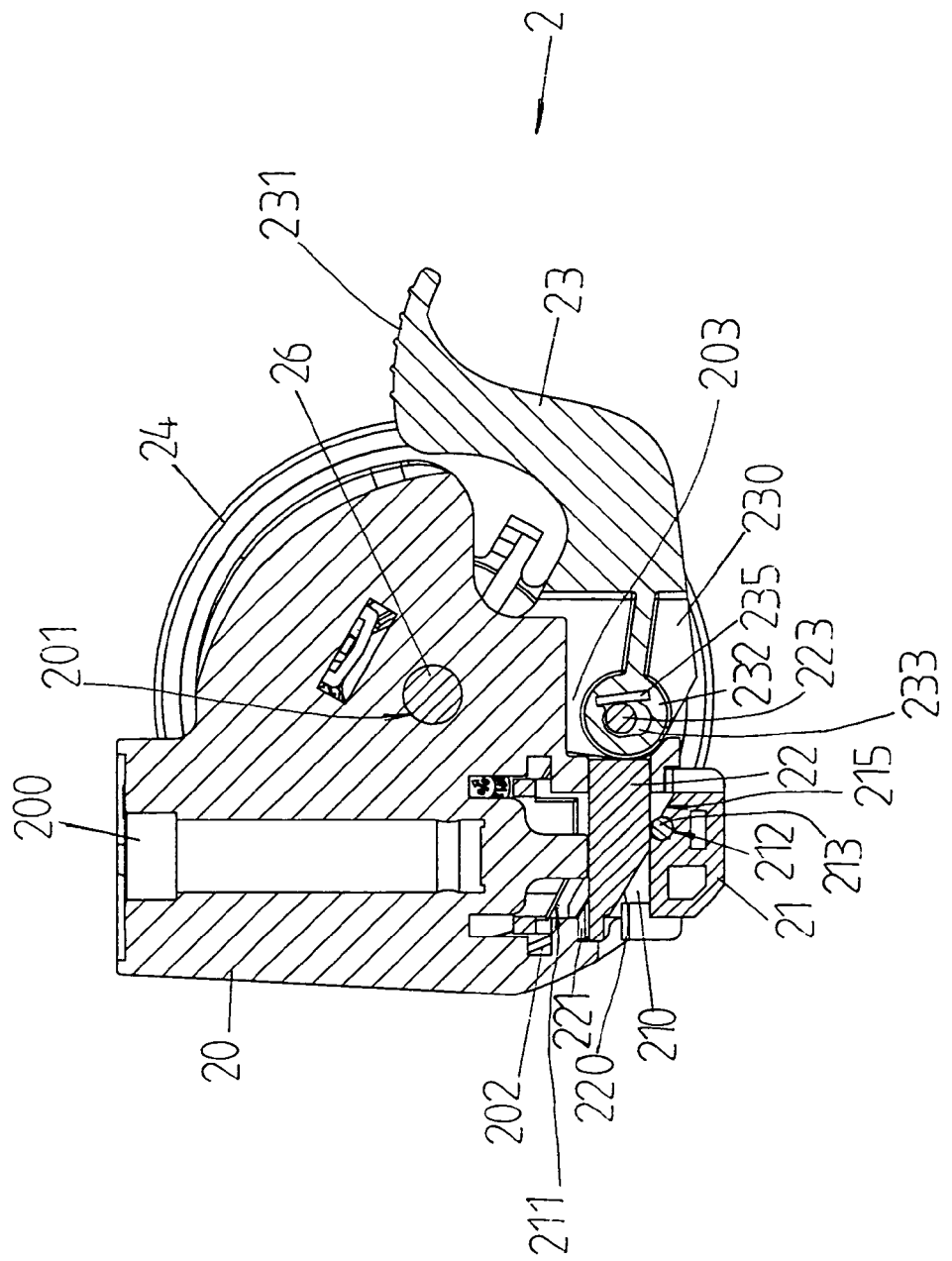
FIG. 4 is a schematic operational view of the castor as shown in FIG. 3.

Referring to the drawings and initially to FIGS. 1-3, a castor in accordance with the preferred embodiment of the present invention comprises a main body 20, two rollers 24 each rotatably mounted on the main body 20, a stop member 21 movably mounted in the main body 20 and movable between a first position as shown in FIG. 3 where the stop member 21 is located at a height higher than that of each of the two rollers 24 and a second position as shown in FIG. 4 where the stop member 21 is located at a height lower than that of each of the two rollers 24, a slide 22 slidably mounted in the main body 20 and rested on the stop member 21 to move the stop member 21, and a control member 23 pivotally mounted on the main body 20 and connected to the slide 22 to move the slide 22.

The main body 20 has a bottom formed with a slideway 203 to allow movement of the slide 22 and a receiving chamber 202 (see FIG. 3) connected and perpendicular to the slideway 203 to allow movement of the stop member 21. The main body 20 has a central portion formed with a shaft hole 201 and has a periphery formed with a mounting hole 200.

The stop member 21 has a side formed with a receiving space 210 connected to the slideway 203 of the main body 20 to allow movement of the slide 22. The receiving space 210 of the stop member 21 has a bottom provided with a tapered pressing face 215 facing the slide 22. The pressing face 215 of the stop member 21 is formed with an arch-shaped receiving recess 212 to receive a metallic rod 213. The receiving space 210 of the stop member 21 has a top provided with a ramp 211. The ramp 211 of the stop member 21 has an end provided with a perpendicular face 214 (see FIG. 5).

The slide 22 has a first end having a bottom provided with a tapered pressing face 220 that is movable to press the pressing face 215 of the stop member 21 to press the stop member 21 downward relative to the main body 20 and a top provided with an oblique push portion 221 that is movable to press the ramp 211 and the perpendicular face 214 of the stop member 21 to press the stop member 21 upward relative to the main body 20. The pressing face 220 of the slide 22 contacts with the metallic rod 213 on the pressing face 215 of the stop member 21 to prevent the stop member 21 from directly touching and rubbing the slide 22 constantly. The slide 22 has a second end formed with a cutout 222 and provided with a driven stub 223 located in the cutout 222.

Each of the two rollers 24 has a central portion formed with a shaft hole 240 and has a side face formed with an annular groove 241 for mounting a washer 25 and a mounting hole 242 for mounting a cover 27.

The control member 23 has a first end pivotally mounted on the main body 20, a mediate portion provided with a drive flange 232 connected with the driven stub 223 of the slide 22 and a second end provided with an outwardly extending press portion 231. The first end of the control member 23 is provided with two opposite pivot ears 230 pivotally mounted on two opposite sides of the main body 20 and located between the two rollers 24. Each of the two pivot ears 230 of the control member 23 is formed with a shaft hole 234. The two pivot ears 230 of the control member 23 have different sizes, and one of the two pivot ears 230 of the control member 23 is located at an open side of the receiving chamber 202 of the main body 20. The drive flange 232 of the control member 23 is pivotally mounted in the cutout 222 of the slide 22 and formed with a through hole 233 pivotally mounted on the driven stub 223 of the slide 22.

A metallic plate 235 is mounted in the through hole 233 of the drive flange 232 of the slide 22 and contacts with the driven stub 223 of the slide 22 to prevent the drive flange 232 of the control member 23 from directly touching and rubbing the driven stub 223 of the slide 22 constantly.

A shaft 26 is extended through the shaft hole 240 of each of the two rollers 24, the shaft hole 234 of each of the two pivot ears 230 of the control member 23 and the shaft hole 201 of the main body 20.

Figure 5:
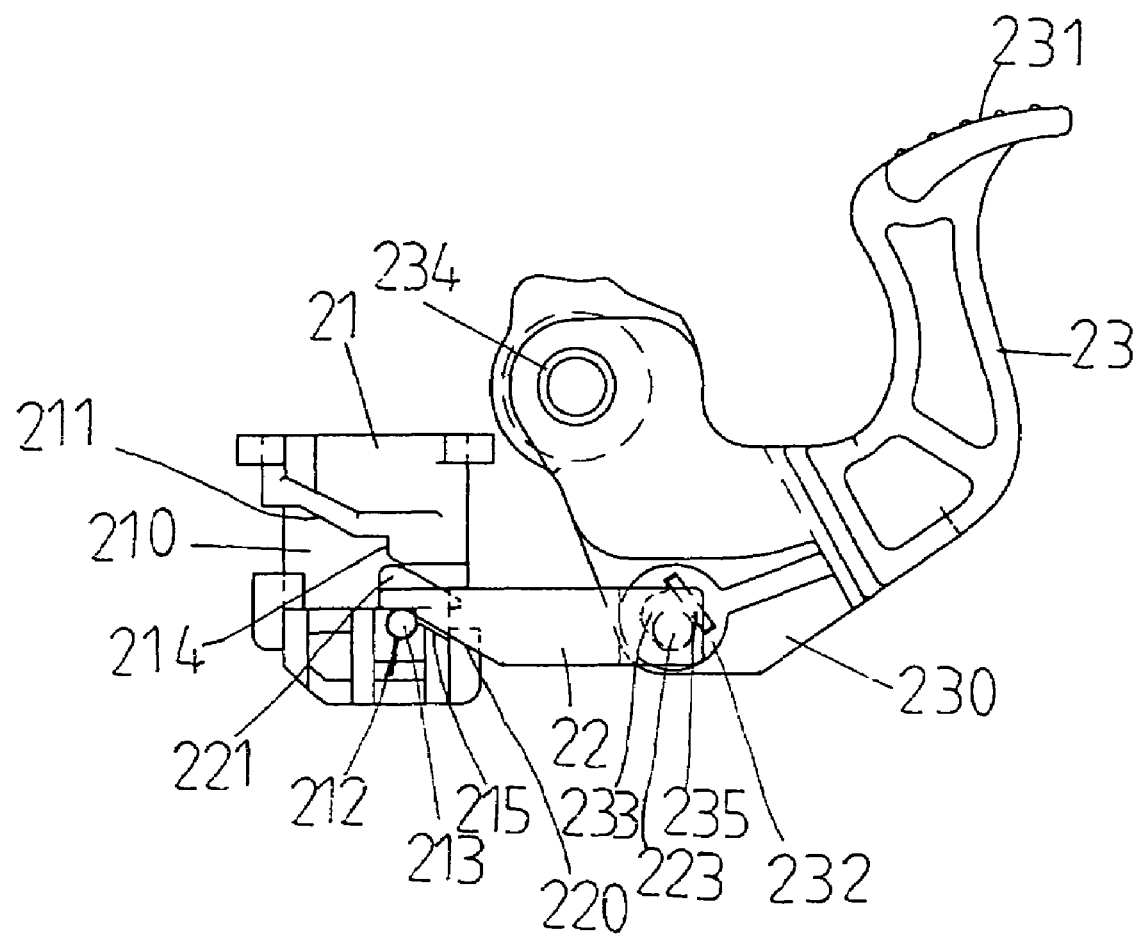
FIG. 5 is a schematic operational view of the castor as shown in FIG. 4.
Figure 7:
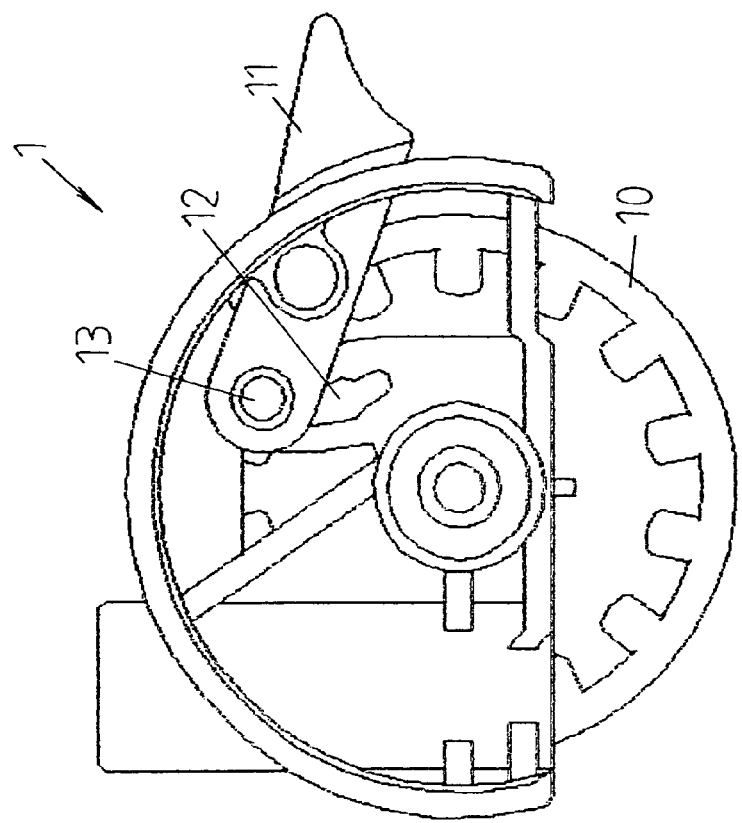
FIG. 7 is a schematic operational view of the conventional castor as shown in FIG. 6.
Figure 6:
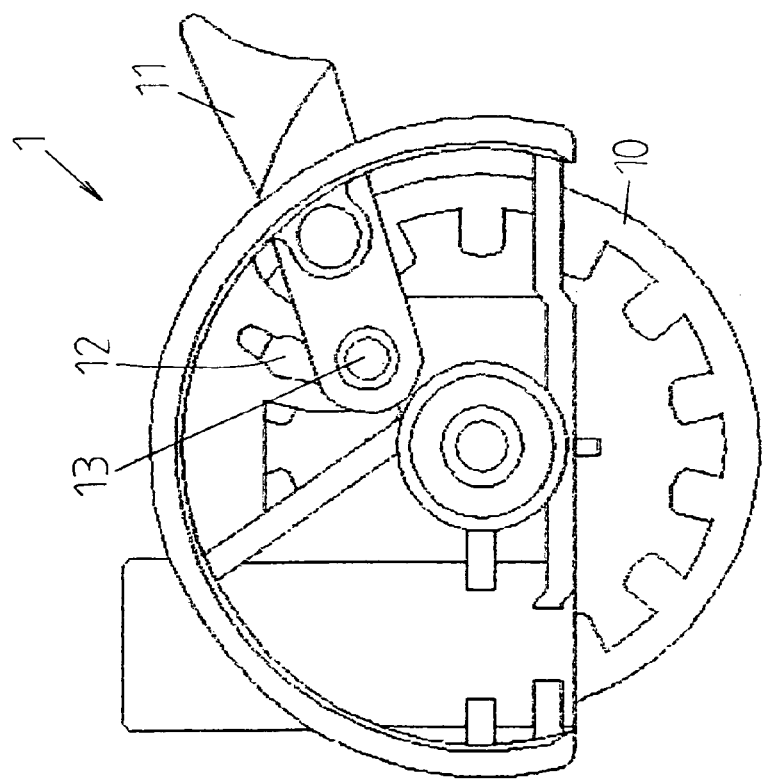
FIG. 6 is a plan view of a conventional castor in accordance with the prior art.

In operation, referring to FIGS. 4 and 5 with reference to FIGS. 1-3, when the stop member 21 is located at a height higher than that of each of the two rollers 24 as shown in FIG. 3, the two rollers 24 are rotatable freely.

As shown in FIG. 4, when the press portion 231 of the control member 23 is pressed downward, the control member 23 is pivoted toward the main body 20 to push the slide 22 toward the stop member 21 so that the pressing face 220 of the slide 22 is movable to press the pressing face 215 of the stop member 21 to press the stop member 21 downward relative to the main body 20 until the stop member 21 is located at a height lower than that of each of the two rollers 24 so as to suspend the two rollers 24 by the stop member 21. Thus, when the stop member 21 is movable downward to rest on the ground, the two rollers 24 are suspended in the air, so that the castor is locked exactly without slipping or moving on the ground.

As shown in FIG. 5, when the press portion 231 of the control member 23 is pulled upward, the control member 23 is pivoted outwardly relative to the main body 20 to move the slide 22 outwardly relative to the stop member 21 so that the push portion 221 of the slide 22 is movable to press the ramp 211 and the perpendicular face 214 of the stop member 21 to press the stop member 21 upward relative to the main body 20 until the stop member 21 is located at a height higher than that of each of the two rollers 24. Thus, the stop member 21 is suspended in the air, and the two rollers 24 are rested on the ground, so that the two rollers 24 are rotatable freely to move the castor.

Accordingly, when the stop member 21 is movable downward to rest on the ground, the two rollers 24 are suspended in the air, so that the castor is locked exactly without slipping or moving on the ground. In addition, the metallic rod 213 is located between the pressing face 215 of the stop member 21 and the pressing face 220 of the slide 22 to prevent the stop member 21 from directly touching and rubbing the slide 22 constantly, thereby preventing the stop member 21 and the slide 22 from being worn out due to frequent friction. Further, the metallic plate 235 is located between the drive flange 232 of the control member 23 and the driven stub 223 of the slide 22 to prevent the control member 23 from directly touching and rubbing the slide 22 constantly, thereby preventing the control member 23 and the slide 22 from being worn out due to frequent friction.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor, comprising:
    a main body;
    two rollers each rotatably mounted on the main body;
    a stop member movably mounted in the main body and movable between a first position where the stop member is located at a height higher than that of each of the two rollers and a second position where the stop member is located at a height lower than that of each of the two rollers;
    a slide slidably mounted in the main body and rested on the stop member to move the stop member;
    a control member pivotally mounted on the main body and connected to the slide to move the slide;
    wherein the main body has a bottom formed with a slideway to allow movement of the slide and a receiving chamber to allow movement of the stop member;
    the stop member has a side formed with a receiving space connected to the slideway of the main body to allow movement of the slide;
    the receiving space of the stop member has a bottom provided with a tapered pressing face facing the slide, and the slide has a first end having a bottom provided with a tapered pressing face that is movable to press the pressing face of the stop member to press the stop member downward relative to the main body.

2. The castor in accordance with claim 1, wherein the pressing face of the stop member is formed with an arch-shaped receiving recess to receive a metallic rod which is located between the pressing face of the stop member and the pressing face of the slide to prevent the stop member from directly touching and rubbing the slide constantly.

3. The castor in accordance with claim 1, wherein the receiving space of the stop member has a top provided with a ramp which has an end provided with a perpendicular face, and the first end of the slide has a top provided with an oblique push portion that is movable to press the ramp and the perpendicular face of the stop member to press the stop member upward relative to the main body.

4. The castor in accordance with claim 1, wherein the slide has a second end formed with a cutout and provided with a driven stub located in the cutout, and the control member has a mediate portion provided with a drive flange connected with the driven stub of the slide.

5. The castor in accordance with claim 4, wherein the drive flange of the control member is pivotally mounted in the cutout of the slide and formed with a through hole pivotally mounted on the driven stub of the slide.

6. The castor in accordance with claim 5, further comprising a metallic plate mounted in the through hole of the drive flange of the slide and located between the drive flange of the control member and the driven stub of the slide to prevent the control member from directly touching and rubbing the slide constantly.

7. The castor in accordance with claim 3, wherein the control member has a first end pivotally mounted on the main body and a second end provided with an outwardly extending press portion.

8. The castor in accordance with claim 7, wherein the first end of the control member is provided with two opposite pivot ears pivotally mounted on two opposite sides of the main body and located between the two rollers.

9. The castor in accordance with claim 8, wherein the two pivot ears of the control member have different sizes.

10. The castor in accordance with claim 8, wherein one of the two pivot ears of the control member is located at an open side of the receiving chamber of the main body.

11. The castor in accordance with claim 8, wherein the main body has a central portion formed with a shaft hole, each of the two rollers has a central portion formed with a shaft hole, each of the two pivot ears of the control member is formed with a shaft hole, and the castor further comprises a shaft extended through the shaft hole of each of the two rollers, the shaft hole of each of the two pivot ears of the control member and the shaft hole of the main body.

12. The castor in accordance with claim 1, wherein the receiving chamber of the main body is connected and perpendicular to the slideway.

13. The castor in accordance with claim 7, wherein when the press portion of the control member is pressed downward, the control member is pivoted toward the main body to push the slide toward the stop member so that the pressing face of the slide is movable to press the pressing face of the stop member to press the stop member downward relative to the main body until the stop member is located at a height lower than that of each of the two rollers so as to suspend the two rollers by the stop member.

14. The castor in accordance with claim 7, wherein when the press portion of the control member is pulled upward, the control member is pivoted outwardly relative to the main body to move the slide outwardly relative to the stop member so that the push portion of the slide is movable to press the ramp and the perpendicular face of the stop member to press the stop member upward relative to the main body until the stop member is located at a height higher than that of each of the two rollers.

15. The castor in accordance with claim 1, wherein each of the two rollers has a side face formed with an annular groove for mounting a washer and a mounting hole for mounting a cover.

\* \* \* \* \*